April 6, 1965 C. M. ECHEVERRIA, JR 3,176,940
HELICOPTER POD POSITIONING AND SUPPORTING MEANS
Filed Jan. 10, 1963 4 Sheets-Sheet 1
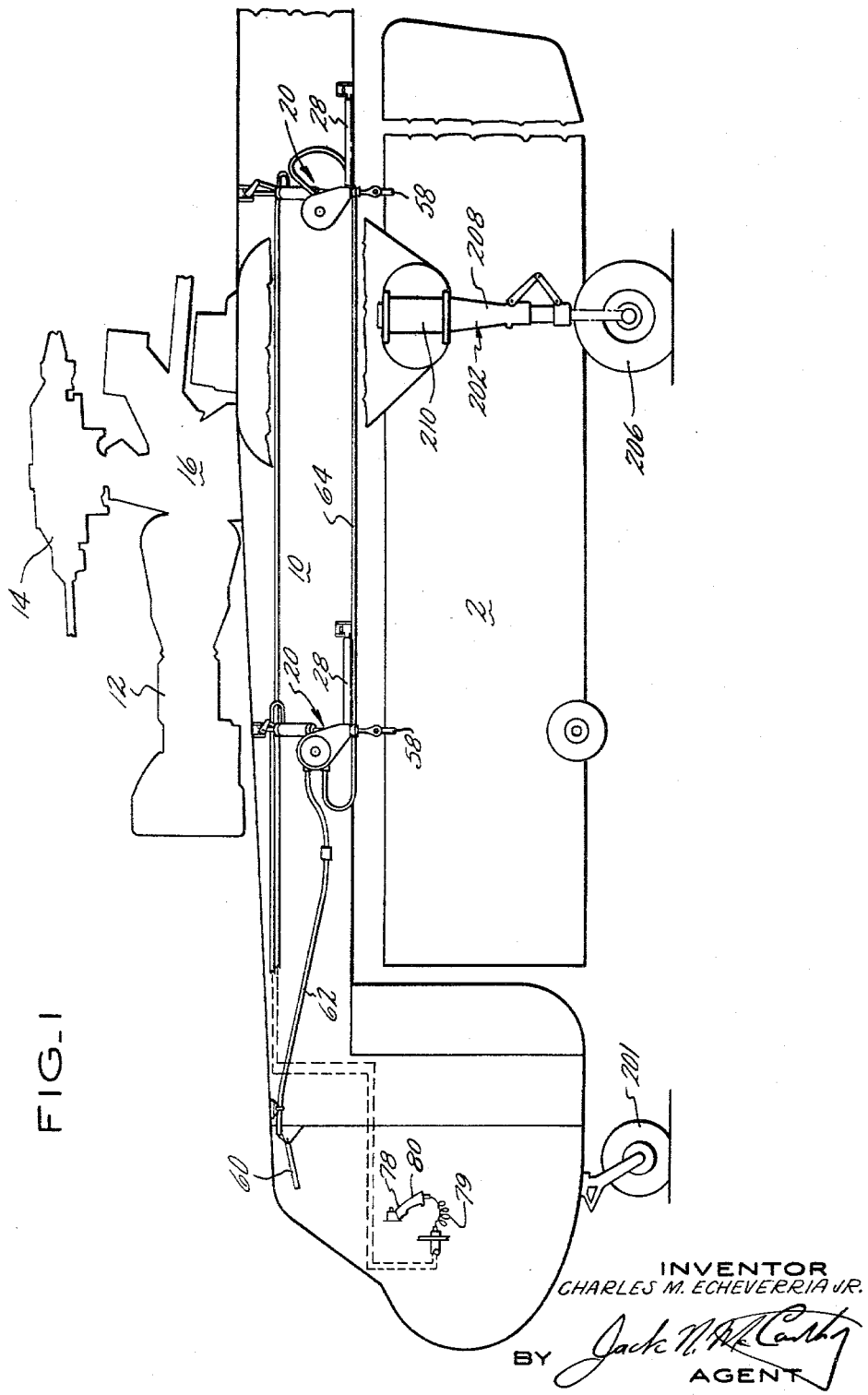
FIG_1
INVENTOR
CHARLES M. ECHEVERRIA JR.
BY Jack N. McCarthy
AGENT

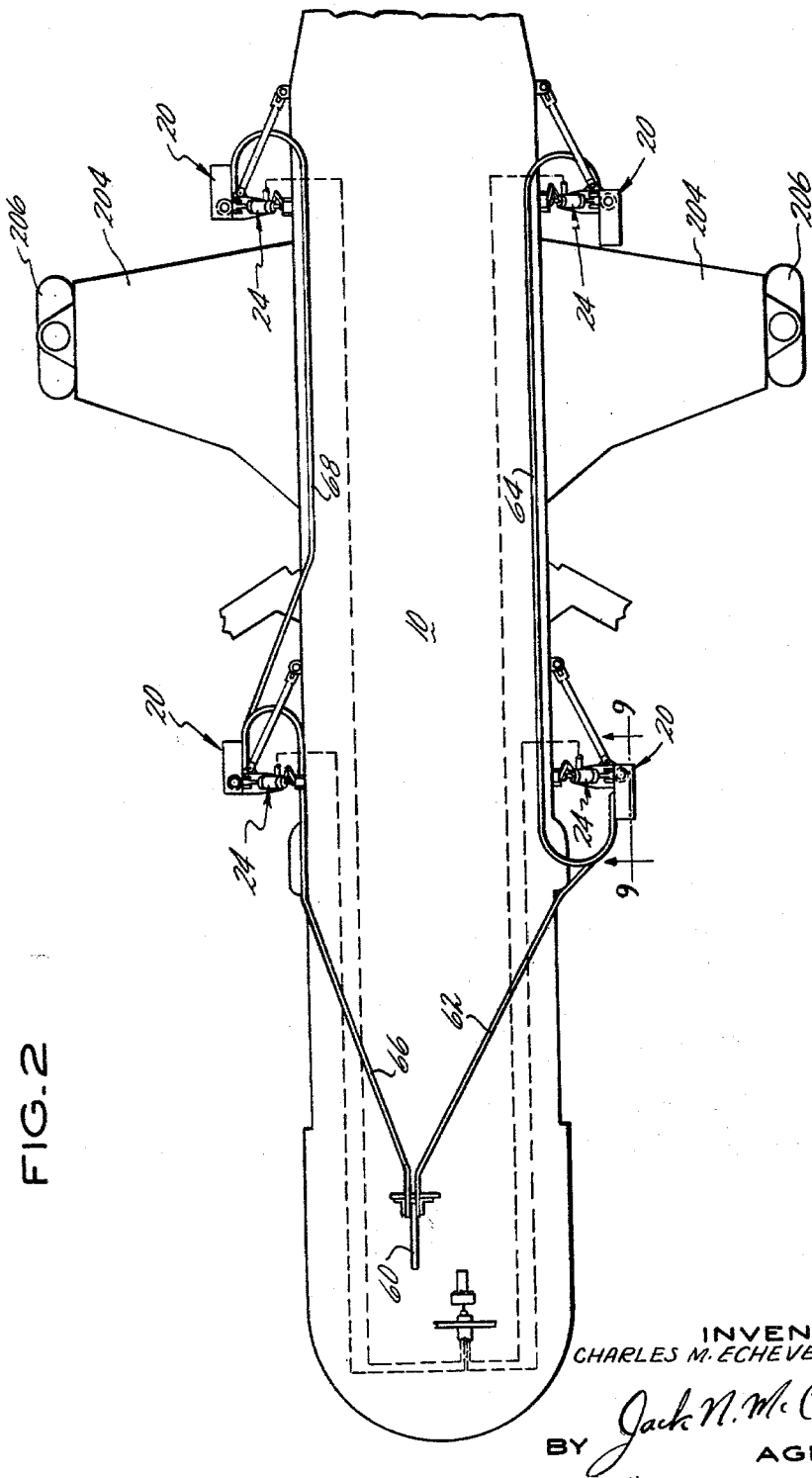

April 6, 1965     C. M. ECHEVERRIA, JR     3,176,940
HELICOPTER POD POSITIONING AND SUPPORTING MEANS
Filed Jan. 10, 1963     4 Sheets-Sheet 3
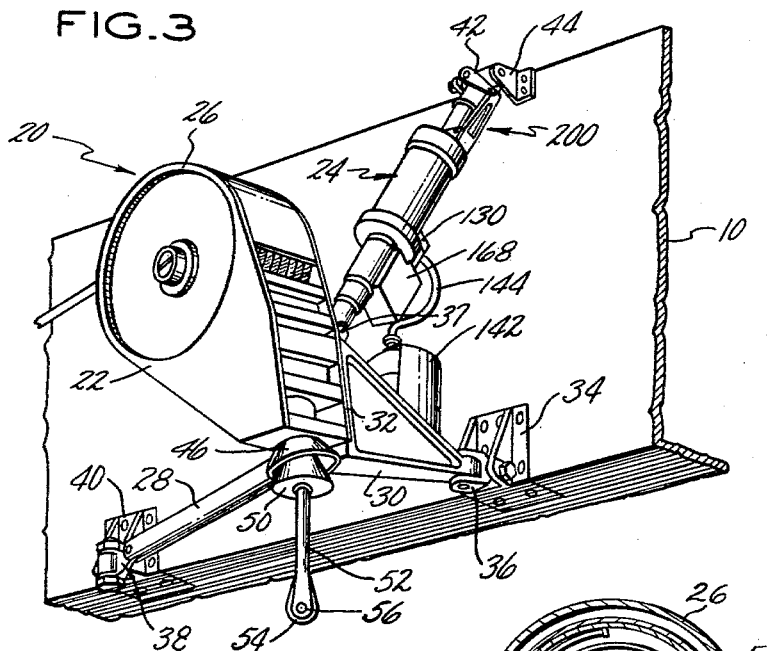
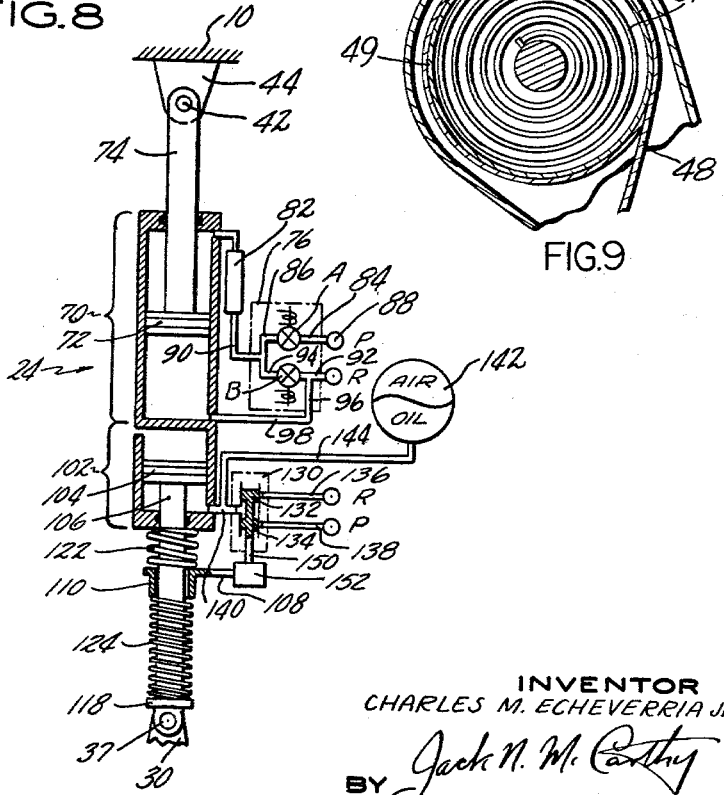
INVENTOR
CHARLES M. ECHEVERRIA JR.
BY Jack N. McCarthy
AGENT April 6, 1965   C. M. ECHEVERRIA, JR   3,176,940
HELICOPTER POD POSITIONING AND SUPPORTING MEANS
Filed Jan. 10, 1963   4 Sheets-Sheet 4
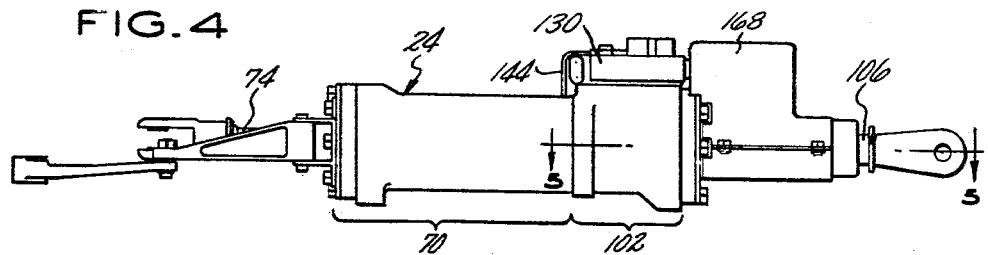
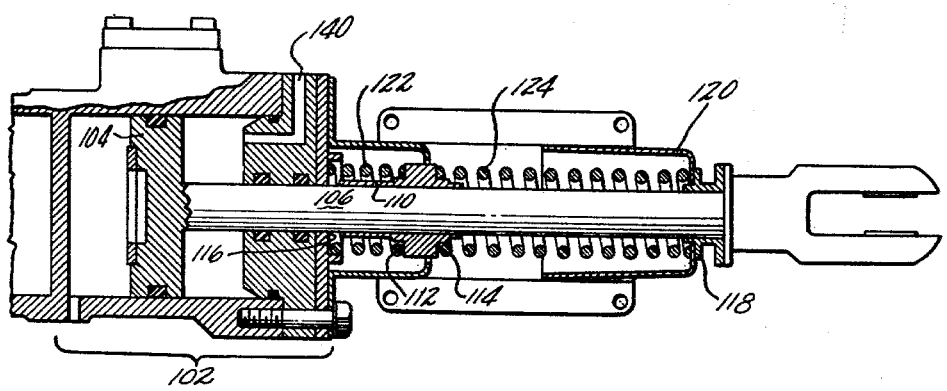
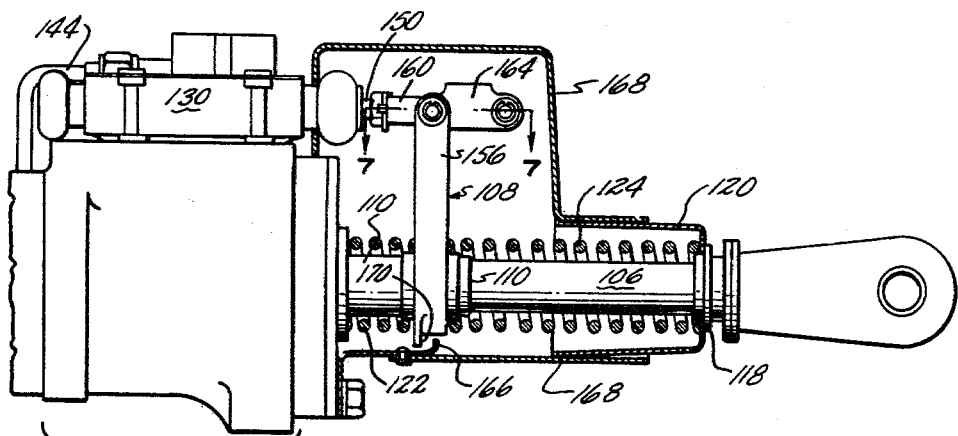
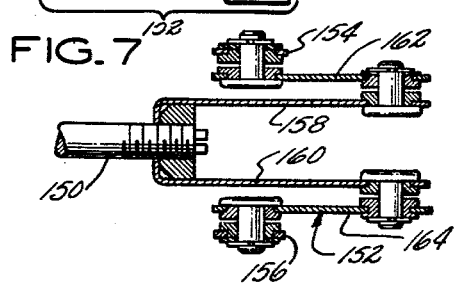
INVENTOR
CHARLES M. ECHEVERRIA JR.
BY Jack N. M. Carthy
AGENT

United States Patent Office 3,176,940
Patented Apr. 6, 1965

3,176,940
HELICOPTER POD POSITIONING AND
SUPPORTING MEANS
Charles M. Echeverria, Jr., Milford, Conn., assignor to United Aircraft Corporation, East Hartford, Conn., a corporation of Delaware
Filed Jan. 10, 1963, Ser. No. 250,632
15 Claims. (Cl. 244—118)

This invention relates to means by which a load, such as a pod or missile for example, can be attached to and supported by a crane helicopter.

An object of this invention is to provide a device which can be attached to a load from a crane helicopter and bring the load to a specific position close to the helicopter from an initially horizontal or canted position.

Another object of this invention is to provide a load mounting device having a plurality of connections in which each connection can be raised or lowered independently.

A further object of this invention is to provide load attaching means which can be independently connected to the load.

Another object of this invention is to provide attaching means which can be released to jettison the load if necessary.

A further object of this invention is to provide attaching means which also acts as a vibration absorber.

Other objects and advantages will be apparent from the specification and claims, and from the accompanying drawings which illustrate an embodiment of the invention.

FIGURE 1 is a side view showing the location of the load supporting means;

FIGURE 2 is a top view showing the location of the load supporting means;

FIGURE 3 is an enlarged view showing one of the load attaching devices;

FIGURE 4 is an enlarged view showing the main controllable positioning link;

FIGURE 5 is a view taken along the line 5—5 of FIGURE 4;

FIGURE 6 is a view partially in section showing the side view of the mechanism shown in FIGURE 5;

FIGURE 7 is a view taken along the line 7—7 of FIGURE 6; and

FIGURE 8 is a schematic view of the main controllable positioning link.

FIGURE 9 is a fragmentary sectional view taken along the line 9—9 of FIGURE 2.

A crane helicopter of the type shown in FIGURES 1 and 2 is also shown in Design Patent No. 193,492. The flight controls for such a helicopter can be similar to those shown in U.S. Patent No. 2,957,648. Since this invention relates to the mounting of a load 2 on a fuselage 10 of a crane helicopter, there will be no further reference to the control system. The load 2 has been shown as a pod which can be used to transport either cargo or passengers. Further, the engine 12, rotor 14, transmission 16, and other related powerplant and flight components have been shown in phantom or omitted to limit the drawings to the invention.

The mounting arrangement shown in FIGURES 1 and 2 discloses four mounting units 20 extending outwardly from the side of the fuselage 10. They are mounted in symmetrical positions with two on each side of the fuselage.

Each of these mounting units 20 includes a load attaching device 22 and a controllable supporting and positioning link 24. As viewed in FIGURE 3, the attaching device comprises a housing 26 which is connected to the fuselage by two rigid links 28 and 30 and the controllable supporting and positioning link 24. Link 30 is formed triangular in shape and has its outer end comprising a flat plate 32 which engages an inner side of the housing 26 and is affixed thereto. The inner end of the link 30 is attached by a universal joint 36 to a bracket 34 which is fixed to the fuselage 10. Link 28 is universally mounted at its outer end to the outer end of link 30 adjacent the bottom of the plate 32. The inner end of link 28 is pivotally mounted for vertical movement on a member 38 which is in turn mounted for horizontal movement on a bracket 40 which is fixed to the fuselage.

The controllable positioning link 24 is connected by a joint 37, permitting universal movement, to the outer end of link 30 adjacent the top of the plate 32 and the upper end of the positioning link 24 is connected by a universal joint 42 to a bracket 44 which is fixed to the fuselage 10. The universal joint action and other pivotal movement just referred to permits easy assembly and disassembly of the mounting units 20 and also provides for movement for each mounting unit 20 between its various operating positions without binding at any link connection.

The load attaching device 22, as mentioned hereinbefore, has a housing which is fixed to the outer end of link 30 for movement therewith by controllable positioning link 24 which will be hereinafter described. The housing 26 is formed having a downwardly extending opening with an outwardly flared cable stop and positioner 46 around said opening. A cable 48 is wound on a drum 49 rotatable within said housing and extends through the opening. The free end of the cable which extends through the opening has a cable stop and positioner 50 fixed thereto which is adapted to abut against and engage the flared cable stop and positioner 46 on the housing. Extending downwardly from the stop 50 and connected to the cable 48 is an attaching member 52 which has a bifurcated end 54 with an opening 56 extending therethrough. This bifurcated portion 54 is constructed to engage a member 58 projecting upwardly from the load 2. A pin extends through the opening 56 in the attaching member 52 and engages an opening in the member 58. While this specific form of attachment has been shown, any other desirable form may be used.

The drum which is rotatable within the housing 26 is biased in a direction so as to move the cable stop and positioner 50 of the cable into position with the flared cable stop and positioner 46 on the housing. For example, when a load attaching device 22 is not attached to a load, the cable stop and positioner 50 is held in engagement with the flared cable stop and positioner 46. When it is desired to attach the bifurcated end 54 of an attaching member 52 with a member 58 on a load, the attaching member 52 is pulled downwardly until the bifurcated end 54 is positioned over the member 58 and a pin has been placed through the opening 56 in the attaching member 54 and the cooperating opening in the member 58. When the cable is released, it is held taut by the biasing means 51 of the housing 26 which is attempting to wind up the cable on the drum.

A control lever 60 is provided in the pilot's compartment which is connected to each of the load attaching devices 22 to lock or unlock the drums collectively. In other words, in connecting a load 2 to the underside of a fuselage 10, the pilot moves the lever 60 to a position unlocking each of the drums of the load attaching devices 22, this then permits each of the cables to be withdrawn from its respective housing 26 and connected by its connecting means to the load. At this point, each cable is held taut, as mentioned before, by the biasing means in its respective attaching device 22. However, when each cable has been connected, the pilot then moves the lever 60 to a position which locks each drum of all of the load attaching devices 22 collectively. This fixes the length of each cable between its respective attaching device 22 and the load 2.

The lever 60 has a control cable which extends down each side of the fuselage to the two load attaching devices located on that side. A cable 62 extends to the left side of the helicopter to the forward load attaching device 22 and a cable 64 extends from this load attaching device 22 to the rear load attaching device 22 located on the same side. This cable 64 merely transfers the movement of the cable 62 from the locking device on the forwardly located attaching device to the locking device on the rearwardly located attaching device. On the right side of the ship a cable 66 extends to the forwardly located load attaching device 22 and a cable 68 extends from the forwardly mounted attaching device 22 to the rearwardly mounted attaching device 22 on the right side. This cable 68 merely transfers the movement of the cable 66 from the locking device on the forwardly located attaching device to the locking device on the rearwardly located attaching device. While a toggle-type mechanical device has been shown to actuate the cables by the lever 60, it is to be understood that other means can be used to simultaneously and collectively lock or unlock the drums of each of the load attaching devices 22.

The cable 48 of each attaching device 22 is not permanently fixedly attached by its end to the drum on which it is wound. Each cable is held on its respective drum by means which permits the cable to be released therefrom when the cable has unwound for its entire length and a predetermined force has been exceeded. This can be done by the use of a break pin, however, any other means can be used. This permits the load 2 to be jettisoned by the pilot when in flight by merely moving the lever 60 to its unlocked position. This permits the weight of the load to pull the cables downwardly from around all of the drums and unwind them until the cables reach their ends and release themselves from the drums by snapping a break pin or operating some other release mechanism. For passenger flight, the locks on the devices 22 are positively locked to that an inadvertent movement of lever 60 will not release the load.

The controllable positioning link 24, which is attached by the outer end of the link 30 adjacent its top and a bracket 44 located adjacent the top of the fuselage 10 is under control of the pilot to change its length. As can be seen in FIGURE 8, the upper part of the controllable positioning link 24 is formed as a cylinder 70 having a piston 72 mounted for reciprocal movement therein. A piston rod 74 is fixedly attached to the top of the piston 72, and extends externally of the cylinder 70, and as stated hereinbefore, since it is the top of the controllable positioning link 24, it is connected by a universal joint 42 to a bracket 44 which is fixed to the fuselage 10.

Each upper part of controllable positioning link 24 includes a valve unit 76 which is controllable by the pilot by a manual control device 78, having a manual grip 80, located in the pilot's compartment. The manual control device 78 has four switches, one for each valve unit 76 of each controllable positioning link 24.

Each valve unit 76 includes a valve "A" which is located between a passageway 84 and passageway 86. The free end of passageway 84 is connected to a pressure source 88 and the free end of passageway 86 is connected by a conduit 90 to the top of cylinder 70 to act on the top of piston 72. Conduit 90 includes a restrictor 82 which governs the rate of flow therethrough. Each valve unit 76 also includes a valve "B" which is located between a passageway 92 and passageway 94. The free end of passageway 92 is connected to a return line, which can be a reservoir or drain, and the free end of 94 is connected to passageway 86. Passageway 92 is also connected to the bottom of cylinder 70 by a passageway 96 and conduit 98 to permit free movement of the piston 72 when such a movement is desired. Both valves "A" and "B" are biased to a closed position and are moved to an open position individually or collectively by control of the manual control device 78. The switch for each of the valve units 76 has a middle position which permits the valves "A" and "B" to be biased to a closed position, a second position which opens valve "A" only, and a third position which opens valve "B" only.

If it is desired to lengthen a link 24, the switch for that link on the manual control 78 is moved to open valve "B" to permit the fluid in the upper part of cylinder 70 above piston 72 to pass therefrom through the restrictor 82 to return or into the bottom part of cylinder 70. The weight of the load provides the force which will move the fluid from the top of the cylinder 70 to extend the link.

If it is desired to shorten a link 24, the switch for that link on the manual control 78 is moved to open valve "A" to direct fluid under pressure to the upper part of cylinder 70 above piston 72. The action will move the cylinder 70 upwardly until the valve "A" is closed or the bottom of cylinder 70 engages piston 72. As mentioned hereinbefore, each switch can be operated separately for each of the links 24; they can also be actuated collectively, for equal lengthening or shortening of all of the links 24.

As can be seen in FIGURE 8, the lower part of the controllable positioning link 24 is formed as a cylinder 102 having a piston 104 mounted for reciprocal movement therein. A piston rod 106 is fixedly attached to the bottom of the piston 104, and extends externally of the cylinder 102, and as stated hereinbefore, since it is the bottom of the controllable positioning link 24, it is connected by a universal joint 37 to the outer end of link 30 adjacent the top of the plate 32. This lower part of each controllable positioning link 24 functions basically as a soft spring with the capability of exhibiting no static deflection under steady load.

The portion of the piston rod 106 extending externally of the piston 102 has an arm means 108 slidably mounted thereon by means of an integral bearing member 110. This bearing member 110 has a spring seat 112 located on its inner side and a spring seat 114 located on its outer side. The lower end of cylinder 102 has a spring seat 116 formed therein and the outer end of piston rod 106 has an integral flange 118 located thereon, which, while it supports a protective shield 120 it also acts as a spring seat along with the mating portion of the shield 120. A spring 122 is positioned around piston rod 106 between the spring seat 112 and spring seat 116, and a spring 124 is positioned around piston rod 106 between spring seat 114 and spring seat 118.

These two springs are selected not only to give sufficient force to actuate arm means 108 upon motion of piston rod 106 but also to provide a differential spring rate which will supply a ratio of movement between piston rod 106 and servo valve stem 150. By properly proportioning the spring rates of the individual springs 122 and 124, a selected ratio may be achieved. This ratio is required because of the relatively large motion of the piston rod 106 in comparison to the motion of valve stem 150.

Static, or substantially static, deflections of piston rod 106 of a magnitude great enough to move the servo piston beyond its deadband area on either side of its cooperating openings will direct fluid into or out of cylinder 102 below piston 104 to actuate the piston and piston rod 106. Small charging deflections of high frequency will tend to be absorbed in the spring arrangement referred to above and maintain movement of the servo piston within the servo valve an amount which will be within the deadband area on each side of the pressure and drain openings. For larger charging deflections of high frequency, the valve has been selected so that the rapid motion of the piston does not materially effect movement of piston rod 106 even though the deadband area has been passed.

A servo valve 130 is connected to the outer portion of cylinder 102. This servo valve 130 has a body with a cylindrical bore therein in which a servo piston is mounted for reciprocal movement. This piston has two lands 132 and 134 engaging said bore which in a null position cover the opening of conduits 136 and 138, respectively, into said bore. These lands are constructed having a small deadband on each side of their respective openings. Conduit 136 is connected to a reservoir or drain, and conduit 138 is connected to a pressure source. The annular space between the lands 132 and 134 is connected to the bottom of cylinder 102 by a conduit 140. Conduit 140 is in turn connected to an accumulator 142 by a conduit 144.

Accumulator 142 is one which contains an air pressure precharge which can be varied to change the spring rate of its associated mounting unit 20. This permits a control of vibratory transmissability between the helicopter and load.

The servo piston has a stem 150 which extends externally of said body. The free external end of the stem 150 is attached by a mechanical device 152 (see FIG. 7) to the free end of arm means 108 to prevent any introduction of side loads and consequent binding in the servo valve 130. The arm means 108 comprises two upstanding members 154 and 156. The stem 150 has two arms 158 and 160 adjustably fixed to and extending from the free end of the stem in the same plane as the stem. These two arms extend between the two arms 154 and 156 of the arm means 108. A link 161 having portions 162 and 164 extends between arms 158 and 160 and arms 154 and 156, respectively. Portion 162 connects the free end of arm 158 to the arm 154 and portion 164 connects the free end of arm 156 with arm 160. Each of these connections is a pivotal one. When the device is at rest with no load, the links 162 and 164 are lined up with the arms 158 and 160. From this arrangement, it can be seen that an angular movement which could cause a binding between the servo valve members is avoided during actuation.

The arm means 108 is permitted a limited axial movement on the piston rod 106 under the influence of both springs. A stop 166 is formed on the housing cover 168 which is used to protect the mechanism from the elements. Cover 168 is fixed to the end of cylinder 102. This cover is also shown in FIGURE 3. A downwardly projecting lug 170 from the bottom of member 110 is constructed to engage the stop 166. As viewed in FIGURE 5, the inward movement of the arm means 108 is stopped by the contact of the inner end of integral bearing member 110 with the bottom of spring seat 116. When the lug 170 has engaged the stop 166 or when the inner end of the bearing member 110 meets with the spring seat 116, the piston rod 106 is free to continue movement by sliding within integral bearing member 110. This construction prevents the servo valve 130 from having its servo piston bottoming on one or the other end of its cooperating cylinder and placing unnecessary unwanted forces on the servo valve and the arm means 108.

A scissors arrangement 200 is connected between the cylinder 70 and aircraft structure to provide a margin of safety in the event that a piston rod 74 or universal joint 42 might fail.

The landing gear comprises a nose wheel 201, and a pair of side units 202. Each side unit 202 is connected to the end of an outwardly extending section 204. These sections 204 act as wings and have a surface of streamline cross section. Each wheel 206 of each side unit is mounted at the free end of a downwardly extending element 208. Each element 208 has its upper end connected to a piston which is mounted for reciprocation in a cylinder 210 fixed to the tip of its cooperating member 204. A control is located in the pilot's compartment to raise or lower the aircraft by lengthening or shortening elements 208.

The control just referred to located in the pilot's compartment is positioned so as to be easily accessible to the pilot. Of the two controls shown in the pilot's compartment, the control 78 is constructed having an expandable cord 79 which permits the control 78 to be passed out an opening to the exterior of the ship where it can then be used by an operator who is able to move very near to the load being lifted or set down and thereby control its movement more precisely.

*Operation*

In affixing a load to a crane helicopter having an apparatus described above, the following sequence can be used:

(a) the crane helicopter and load are so positioned that the mounting units 20 are located in a plane over the load to be attached thereto;

(b) the mounting units 20 are positioned at their lowest position, that is, the links 24 are placed in their extended position by the manual control device 78;

(c) the load attaching devices 22 are placed in an unlocked position by control lever 69;

(d) each attaching member 52 of each cable 48 is drawn from its load attaching device 22 and attached to the load;

(e) the cable is released and pulled into a taut position by the biasing means within each load attaching device 22;

(f) control lever 69 is moved so as to place the drums in a locked position thereby fixing the length of each of the cables 48 which extends from its respective housing 26;

(g) the load attaching devices 22 are then moved upwardly either individually or collectively by use of the manual control device 78 to place the load in a desired position. The manual control device 78 which is attached to its position in the aircraft by an expandable cord 79 can be used by an operator externally of the aircraft to have precise control over movements of the load; and (h) the load in flight now is isolated from vibrations set up by the crane helicopter. This is provided by the fixed cable lengths extending from each mounting unit 20 and the lower portion of each link 24.

The specific construction of mounting link 24 connected between the helicopter and load is also shown and claimed in copending application Serial No. 250,631, filed concurrently herewith to Kenneth C. Mard and Richard A. Orr for Helicopter Pod Supporting Device.

It is to be understood that the invention is not limited to the specific description above or to the specific figures, but may be used in other ways without departure from its spirit as defined by the following claims.

I claim:

1. In combination:
   (a) an aircraft having a fuselage;
   (b) said fuselage being shaped so as to receive a load thereunder;
   (c) a load;
   (d) means on said fuselage for mounting said load on said fuselage;
   (e) said mounting means comprising a plurality of load attaching devices;
   (f) each load attaching device having means for connecting it to said load;
   (g) said mounting means including a controllable positioning link for each load attaching device; and
   (h) means for controlling each link to raise and lower its respective load attaching device.

2. In combination:
   (a) an aircraft having a fuselage;
   (b) said fuselage being shaped so as to receive a load thereunder;
   (c) a load;
   (d) means on said fuselage for mounting said load on said fuselage;

(e) said mounting means comprising a plurality of load attaching devices extending from the side of the fuselage;
(f) each load attaching device having means extending downwardly for connecting it to said load;
(g) said mounting means including a controllable positioning link for each load attaching device; and
(h) means for controlling each link to raise and lower its respective load attaching device.

3. In combination:
(a) an aircraft having a fuselage;
(b) said fuselage having a pilot's compartment;
(c) said fuselage being shaped so as to receive a pod thereunder;
(d) a pod;
(e) means on said fuselage for mounting said pod on said fuselage;
(f) said mounting means comprising a plurality of pod attaching devices extending from the side of the fuselage;
(g) each pod attaching device having means extending downwardly for connecting it to said pod;
(h) said mounting means including a controllable positioning link for each pod attaching device; and
(i) means connected within said pilot's compartment for controlling each link to raise and lower its respective pod attaching device.

4. In combination:
(a) an aircraft having a fuselage;
(b) said fuselage being shaped so as to receive a load thereunder;
(c) a load;
(d) said load having a first connecting means;
(e) means on said fuselage for mounting said load on said fuselage;
(f) said mounting means comprising a plurality of load attaching devices;
(g) each load attaching device having:
    (1) second connecting means for engagement with the first connecting means of said load;
    (2) cable means fixed to each second connecting means;
    (3) biasing means for biasing the cable means towards the load attaching device; and
    (4) means for locking said cable means in place;
(h) said mounting means including a controllable positioning link for each load attaching device; and
(i) means for controlling each link to raise and lower its respective load attaching device.

5. In combination:
(a) an aircraft having fuselage;
(b) said aircraft having a landing gear;
(c) said fuselage being shaped so as to receive a load thereunder;
(d) said fuselage having a pilot's compartment;
(e) a load;
(f) said load having a first connecting means;
(g) means on said fuselage for mounting said load on said fuselage;
(h) said mounting means comprising a plurality of load attaching devices;
(i) each load attaching device having:
    (1) second connecting means for engagement with the first connecting means of said load;
    (2) cable means fixed to each second connecting means;
    (3) biasing means for biasing the cable means towards the load attaching device; and
    (4) means for locking said cable means in place;
(j) said mounting means including a controllable positioning link for each load attaching device; and
(k) means for controlling each link to raise and lower its respective load attaching device.

6. In combination:
(a) an aircraft having a fuselage;
(b) said fuselage being shaped so as to receive a load thereunder;
(c) said fuselage having a pilot's compartment;
(d) a load;
(e) said load having a first connecting means;
(f) means on said fuselage for mounting said load on said fuselage;
(g) said mounting means comprising a plurality of load attaching devices;
(h) each load attaching device having:
    (1) second connecting means for engagement with the first connecting means of said load;
    (2) cable means fixed to each second connecting means;
    (3) biasing means for biasing the cable means towards the load attaching device; and
    (4) means for locking said cable means in place;
(i) means in said pilot's compartment for collectively actuating said locking means;
(j) said mounting means including a controllable positioning link for each load attaching device; and
(k) means for controlling each link to raise and lower its repsective load attaching device.

7. In combination in an aircraft:
(a) a fuselage;
(b) said fuselage being shaped so as to receive a load thereunder;
(c) a load;
(d) means on said fuselage for mounting said load on said fuselage;
(e) said mounting means comprising a plurality of load attaching devices;
(f) each load attaching device having:
    (1) a rotatable drum mounted therein;
    (2) a cable wound on said drum and extending from said load attaching device;
    (3) said drum being biased so as to wind the cable on said drum;
    (4) means on the end of said cable for connecting it to said load; and
    (5) means for locking said drum;
(g) said mounting means including a controllable positioning link for each load attaching device; and
(h) means for controlling each link to raise and lower its respective load attaching device.

8. In combination in an aircraft:
(a) a fuselage;
(b) said fuselage being shaped so as to receive a load thereunder;
(c) a load;
(d) means on said fuselage for mounting said load on said fuselage;
(e) said mounting means comprising a plurality of load attaching devices;
(f) each load attaching device having:
    (1) a rotatable drum mounted therein;
    (2) a cable wound on said drum and extending from said load attaching device;
    (3) said drum being biased so as to wind the cable on said drum;
    (4) means on the end of said cable for connecting it to said load; and
    (5) means for locking said drum;
(g) means for collectively actuating all of said locking means;
(h) said mounting means including a controllable posing link for each load attaching device; and
(i) means for controlling each link to raise and lower its respective load attaching device.

9. In combination in an aircraft:
(a) a fuselage;
(b) said fuselage having a pilot's compartment;
(c) said fuselage being shaped so as to receive a load thereunder;
(d) a load;

(e) means on said fuselage for mounting said load on said fuselage;
(f) said mounting means comprising a plurality of load attaching devices;
(g) each load attaching device having:
    (1) a rotatable drum mounted therein;
    (2) a cable wound on said drum and extending from said load attaching device;
    (3) said drum being biased so as to wind the cable on said drum;
    (4) means on the end of said cable for connecting it to said load; and
    (5) means for locking said drum;
(h) means in said pilot's compartment for collectively actuating all of said locking means;
(i) said mounting means including a controllable positioning link for each load attaching device; and
(j) means connected in said pilot's compartment for controlling each link to raise and lower its respective load attaching device.

10. In combination:
(a) an aircraft having a fuselage;
(b) said fuselage being shaped so as to receive a load thereunder;
(c) a load;
(d) mounting means on said fuselage for mounting said load on said fuselage;
(e) said mounting means comprising a plurality of arm means extending from the sides of said fuselage;
(f) each of said arm means being pivotally connected to said fuselage;
(g) said mounting means comprising a load attaching device connected to the free end of each arm means;
(h) each load attaching device having means extending downwardly for connecting it to said load;
(i) said mounting means including a controllable positioning link for each load attaching device; and
(j) means for controlling each link to raise and lower its respective load attaching device to a desired position between limits.

11. In combination:
(a) an aircraft having a fuselage;
(b) said fuselage being shaped so as to receive a load thereunder;
(c) a load;
(d) said load having a first connecting means;
(e) mounting means on said fuselage for mounting said load on said fuselage;
(f) said mounting means comprising a plurality of load attaching devices located on each side of said fuselage;
(g) each load attaching device having:
    (1) second connecting means for engagement with the first connecting means of said load;
    (2) cable means fixed to each second connecting means;
    (3) biasing means for biasing the cable means so that the second connecting means is biased towards the load attaching device; and
    (4) means for locking said cable means in place;
(h) said mounting means including a controllable positioning link for each load attaching device; and
(i) means for controlling each link to raise and lower its respective load attaching device.

12. In combination:
(a) an aircraft having a fuselage;
(b) said fuselage being shaped so as to receive a load thereunder;
(c) said fuselage having a pilot's compartment;
(d) a load;
(e) said load having a first connecting means;
(f) mounting means on said fuselage for mounting said load on said fuselage;
(g) said mounting means comprising a plurality of arm means extending from the sides of said fuselage;
(h) each of said arm means being pivotally connected to said fuselage;
(i) said mounting means comprising a load attaching device connected to the free end of each arm means;
(j) each load attaching device having:
    (1) second connecting means for engagement with the first connecting means of said load;
    (2) cable means fixed to each second connecting means;
    (3) biasing means for biasing the cable means to pull the second connecting means towards the load attaching device; and
    (4) means for locking said cable means in place;
(k) means in said pilot's compartment for collectively actuating said locking means;
(l) said mounting means including a controllable positioning link for each load attaching device; and
(m) means for controlling each link to raise and lower its respective load attaching device.

13. In combination:
(a) an aircraft having a fuselage;
(b) said fuselage having a section shaped so as to receive a load thereunder;
(c) said section having a top and bottom;
(d) a load;
(e) mounting means located on the sides of said fuselage for mounting said load on said fuselage;
(f) said mounting means comprising a plurality of arm means extending outwardly from the sides of said fuselage section adjacent its bottom;
(g) each of said arm means having a pivotal connection with said section;
(h) said mounting means comprising a load attaching device connected to the free end of each arm means;
(i) each load attaching device having means extending downwardly for connecting it to said load;
(j) said mounting means including a controllable positioning link for each load attaching device;
(k) each of said links being connected between the side of said fuselage adjacent its top and its cooperating load attaching device;
(l) the connections of each of said links to said load attaching device and said fuselage being pivotal ones; and
(m) means for controlling each link to raise and lower its respective load attaching device.

14. In combination:
(a) an aircraft having a fuselage;
(b) said fuselage being shaped so as to receive a load thereunder;
(c) a load;
(d) said load having a first connecting means;
(e) means on said fuselage for mounting said load on said fuselage;
(f) said mounting means comprising a plurality of load attaching devices;
(g) each load attaching device having:
    (1) second connecting means for engagement with the first connecting means of said load;
    (2) cable means fixed to each second connecting means;
    (3) biasing means for keeping the cable taut when said first and second connecting means are engaged; and
    (4) means for locking said cable means in place;
(h) said mounting means including a controllable positioning link for each load attaching device;
(i) means for controlling each link to raise and lower its respective load attaching device; and
(j) means for actuating all of said locking means simultaneously when all of the load attaching devices are connected to the load.

15. In combination:
(a) an aircraft having a fuselage;
(b) said fuselage being shaped so as to receive a load thereunder;
(c) an elongated load;
(d) means on said fuselage for mounting said elongated load on said fuselage;
(e) said mounting means comprising a plurality of load attaching devices extending from the side of the fuselage;
(f) each load attaching device having means for connecting it to said load;
(g) each of said last-named means comprising a housing having a drum rotatably mounted therein;
(h) each of said drums having a cable wound therearound;
(i) each of said drums being biased to wind its cable upon its respective drum;
(j) when a cable has been connected to a load, said spring holding the cable taut;
(k) means for fixing the cable lengths;
(l) said mounting means including a controllable positioning link for each load attaching device; and
(m) means for controlling each link to raise and lower its respective load attaching device.

References Cited by the Examiner
UNITED STATES PATENTS

| | | | |
|---|---|---|---|
| 2,794,607 | 6/57 | Robboy | 242—107.3 |
| 2,876,969 | 3/59 | Tydon et al. | 244—118 |
| 2,953,330 | 9/60 | Lysak | 244—118 |
| 2,973,923 | 3/61 | Sznycer. | |
| 3,021,089 | 2/62 | Becker | 242—107.3 |

FOREIGN PATENTS 863,686   3/61   Great Britain.

FERGUS S. MIDDLETON, *Primary Examiner.*

Disclaimer 3,176,940.—*Charles M. Echeverria, Jr.*, Milford, Conn. HELICOPTER POD POSITIONING AND SUPPORTING MEANS. Patent dated Apr. 6, 1965. Disclaimer filed Nov. 27, 1970, by the assignee, *United Aircraft Corporation*.

Hereby enters this disclaimer to claims 1 through 3 of said patent.

[*Official Gazette March 2, 1971.*]